US011971680B2

(12) United States Patent
Otaka

(10) Patent No.: US 11,971,680 B2
(45) Date of Patent: Apr. 30, 2024

(54) IMAGE FORMING APPARATUS WITH EXTERIOR COVER OPENABLE TO FORM A DISCHARGE TRAY

(71) Applicant: CANON KABUSHIKI KAISHA, Tokyo (JP)

(72) Inventor: Hisashi Otaka, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/535,410

(22) Filed: Nov. 24, 2021

(65) Prior Publication Data

US 2022/0187747 A1 Jun. 16, 2022

(30) Foreign Application Priority Data

Dec. 14, 2020 (JP) ................................ 2020-206770

(51) Int. Cl.
*G03G 15/20* (2006.01)
*G03G 15/00* (2006.01)
*G03G 21/16* (2006.01)

(52) U.S. Cl.
CPC ..... *G03G 21/1638* (2013.01); *G03G 15/2017* (2013.01); *G03G 15/6573* (2013.01); *G03G 21/1633* (2013.01); *G03G 2221/1654* (2013.01)

(58) Field of Classification Search
CPC ....... G03G 21/1633; G03G 2221/1654; G03G 15/2017; G03G 15/6573
See application file for complete search history.

(56) References Cited

U.S. PATENT DOCUMENTS

| | | | | |
|---|---|---|---|---|
| 7,477,860 B2 * | 1/2009 | Hanano | G03G 21/1633 399/92 |
| 9,927,750 B2 * | 3/2018 | Kosaka | G03G 15/2028 |
| 10,353,329 B2 | 7/2019 | Ogasawara | G03G 15/206 |
| 10,459,382 B2 * | 10/2019 | Iizuka | G03G 21/1853 |
| 11,520,257 B2 * | 12/2022 | Koyama | G03G 15/2032 |
| 2017/0010574 A1 * | 1/2017 | Kinoshita | G03G 15/2028 |
| 2019/0049891 A1 * | 2/2019 | Iikura | G03G 21/1633 |

FOREIGN PATENT DOCUMENTS

JP 2018-106028 7/2018

* cited by examiner

*Primary Examiner* — Arlene Heredia
(74) *Attorney, Agent, or Firm* — Venable LLP

(57) ABSTRACT

An abutting portion that abuts on an operation lever for moving a pressure roller is provided on an inner side of an exterior cover provided so as to be openable and closable with respect to a housing that accommodates a fixing unit. The pressure roller is movable to a first pressing position where the pressure roller presses a heating roller with a first pressing force and to a second pressing position where the pressure roller presses the heating roller with a second pressing force smaller than the first pressing force. In addition, the operation lever is moved to a first position for positioning the pressure roller at the first pressing position and to a second position for positioning the pressure roller at the second pressing position. When the exterior cover is closed while the operation lever is located at the second position, the abutting portion abuts on the operation lever.

7 Claims, 7 Drawing Sheets

IMAGE FORMING APPARATUS WITH EXTERIOR COVER OPENABLE TO FORM A DISCHARGE TRAY

BACKGROUND OF THE INVENTION

Field of the Invention

The present invention relates to an image forming apparatus that forms an image on a sheet.

Description of the Related Art

Conventionally, as an image forming apparatus that forms an image on a sheet, a configuration is known in which an image formed on a photoreceptor is transferred to a sheet by a transfer portion, the transferred image is fixed to the sheet by a fixing portion, and the sheet on which the image is fixed is discharged to a discharge tray in an upper portion of the apparatus.

In recent years, it has been required by users that an image forming apparatus copes with various types of sheets such as plain paper, cardboard, and an envelope. In order to cope with such various types of sheets, a configuration is known in which an exterior cover on an apparatus side surface (or an apparatus back surface) is opened, and a sheet on which an image is fixed by a fixing portion is discharged in a horizontal direction from the apparatus side surface.

In addition, a configuration for adjusting a nip pressure between a heating roller and a pressure roller pressed by the heating roller in a fixing portion is disclosed for the purpose of coping with a sheet such as cardboard having a basis weight larger than that of plain paper or an envelope having a size smaller than that of plain paper.

Japanese Patent Application Laid-Open No. 2018-106028 discloses a configuration in which a pressure adjusting lever is operated to switch a nip pressure of a fixing portion between a normal first pressing force (for passing of plain paper) and a second pressing force smaller than the first pressing force for passing cardboard or an envelope. Then, the pressure adjusting lever is operated such that the nip pressure becomes the second pressing force when, for example, an envelope is used, and the posture is held at the position after the operation.

That is, in the above-described conventional technique, when printing is performed on an envelope, printing is performed on the envelope by opening the exterior cover and operating the pressure adjustment lever to switch the nip pressure of the fixing portion to the second pressing force.

However, in the conventional technique, the exterior cover may be closed without switching the nip pressure of the fixing portion to the normal first pressing force after the printing of the envelope is finished. In this case, there is a problem in which an image defect occurs due to an insufficient nip pressure of the fixing portion when printing is performed on plain paper.

SUMMARY OF THE INVENTION

An image forming apparatus comprising:

a fixing unit that has a heating roller configured to heat an unfixed image formed on a sheet, and a pressure roller configured to sandwich and press the sheet with the heating roller, the fixing unit fixing the unfixed image to the sheet;

an operation lever that moves the pressure roller, the operation lever being movable to (1) a first position for positioning the pressure roller at a first pressing position where the pressure roller presses the heating roller with a first pressing force and (2) a second position for positioning the pressure roller at a second pressing position where the pressure roller presses the heating roller with a second pressing force smaller than the first pressing force;

a housing that accommodates the fixing unit;

an exterior cover that is provided in the housing so as to be openable and closable and forms an exterior of the image forming apparatus, the exterior cover being openable and closable in a close position and an open position in which the exterior cover is opened for discharging a sheet that has passed through the fixing unit onto an inner side of the exterior cover; and an abutting portion that is provided on the inner side of the exterior cover and abuts on the operation lever, wherein the abutting portion (1) abuts on the operation lever during movement of the exterior cover from the open position to the close position so as not to allow the exterior cover to be closed when the operation lever is located at the second position, and (2) does not abut on the operation lever during the movement of the exterior cover from the open position to the close position so as to allow the exterior cover to be closed when the operation lever is located at the first position.

Further features of the present invention will become apparent from the following description of exemplary embodiments with reference to the attached drawings.

DESCRIPTION OF THE EMBODIMENTS

Hereinafter, embodiments of the present invention will be exemplarily described with reference to the drawings. However, the dimensions, materials, shapes, relative arrangements, and the like of the components described in the following embodiments should be appropriately changed depending on the configuration of the apparatus to which the present invention is applied and various conditions, and the scope of the present invention is not intended to be limited only to them.

An image forming apparatus according to the present embodiment will be described with reference to FIGS. 1 to 6.

Figure 2:
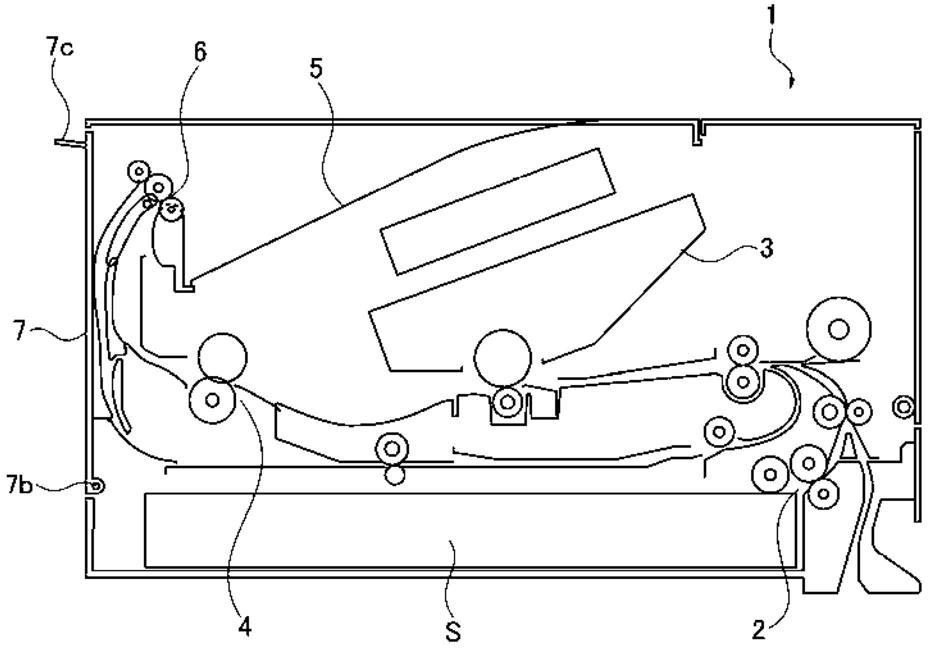
FIG. 2 is a cross-sectional view of an image forming apparatus.

First, a schematic configuration of the image forming apparatus will be described with reference to FIG. 2. FIG. 2 is a cross-sectional view illustrating a schematic configuration of the image forming apparatus according to the present embodiment. Here, a laser beam printer that forms an image on a sheet is illustrated as the image forming apparatus.

An image forming apparatus 1 includes a fixing portion (fixing unit) 4 that fixes an image on a sheet S. The image forming apparatus 1 is provided with a feeding portion 2 including the sheet S in a lower portion of the apparatus. The sheet S fed from the feeding portion 2 is conveyed to an image forming portion 3, and an image is formed on the sheet S in the image forming portion 3. Thereafter, the sheet S on which the image is formed is conveyed to the fixing portion 4, and the image is fixed to the sheet S by heat and pressure in the fixing portion 4. The sheet S on which the image is fixed is conveyed to a discharge portion 6 and is discharged, by the discharge portion 6, to a discharge tray 5 arranged in an upper portion of the apparatus.

The image forming apparatus 1 is provided with a rear door 7 which is an opening/closing member. The rear door (exterior cover) 7 is provided to be rotatable (openable and closable) around a shaft 7*b* in a housing of the image forming apparatus 1. The housing here accommodates the fixing portion 4 and is a part of the image forming apparatus 1. The housing accommodating the fixing portion 4 and the rear door 7 are combined to form a main body of the image forming apparatus 1. The rear door 7 can be displaced between a close position (a position illustrated in FIG. 2) in which the rear door 7 is engaged with the image forming apparatus 1 and an open position (not illustrated) in which the rear door 7 is retracted from the close position by releasing the engagement using a handle 7*c*. As illustrated in FIG. 2, when the rear door 7 is closed, a conveyance path is formed such that the sheet S that has passed through the fixing portion 4 is discharged to the discharge tray 5. For example, when an envelope is printed, the rear door 7 is opened. The envelope that has passed through the fixing portion 4 is discharged onto the inner side of the rear door 7 that is open. In addition, for example, when a sheet jam occurs between the fixing portion 4 and the discharge portion 6, the rear door 7 is opened to open a space between the fixing portion 4 and the discharge portion 6 in the image forming apparatus 1 so that the sheet can be easily removed. In other words, the rear door (exterior cover) 7 is openable and closable in the close position and the open position in which the rear door 7 is opened for discharging the sheet that has passed through the fixing portion (fixing unit) 4 onto the inner side of the rear door 7.

Figure 1:
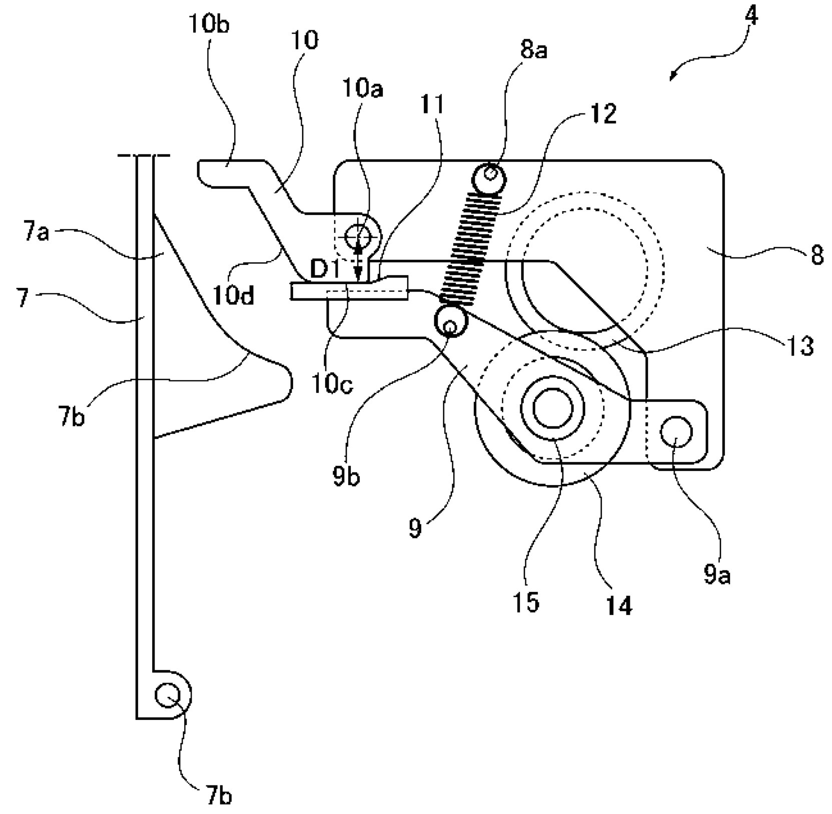
FIG. 1 is a cross-sectional view of a fixing portion.

Next, the fixing portion 4 in the image forming apparatus 1 will be described with reference to FIG. 1. FIG. 1 is a cross-sectional view illustrating the fixing portion 4 in the image forming apparatus 1 according to the present embodiment.

As illustrated in FIG. 1, the fixing portion 4 includes a heating roller 13 as a heating member and a pressure roller 14 as a pressure member that is pressed against the heating roller 13 and conveys the sheet S between the heating roller 13 and the pressure roller 14. The heating roller 13 includes a heater in a cylindrical roller. The pressure roller 14 is disposed below the heating roller 13 in a vertical direction. The fixing portion 4 heats the sheet S by the heater while nipping the sheet S between the heating roller 13 and the pressure roller 14 to fix the image (developer image) to the sheet S.

Figure 3:
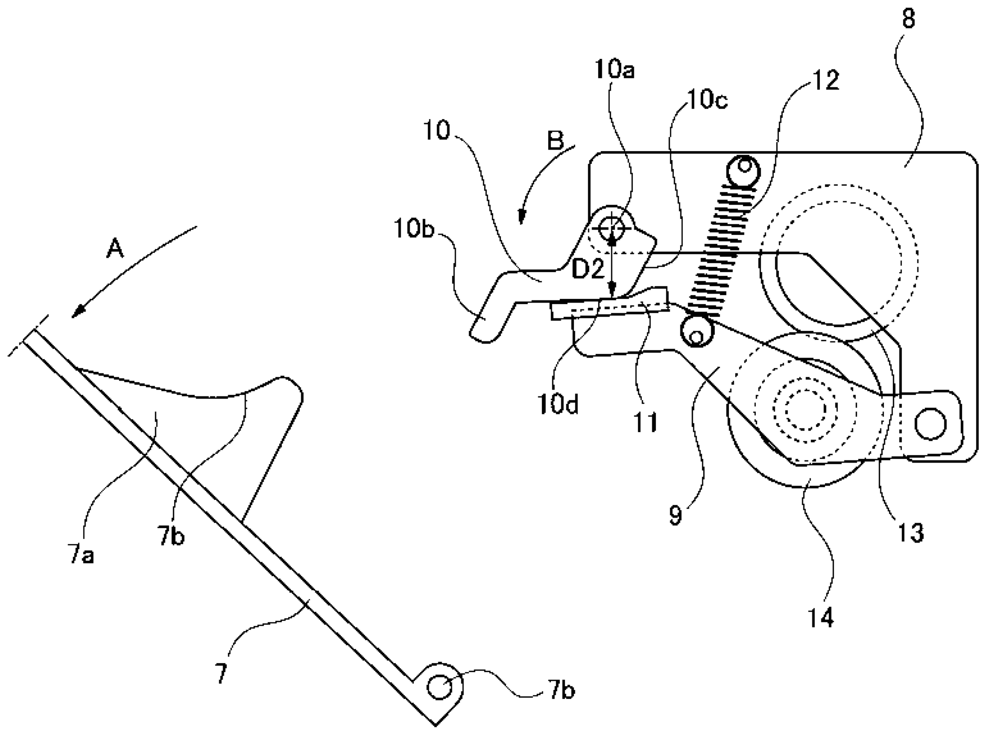
FIG. 3 is an explanatory view of operation of a switching lever.
Figure 4:
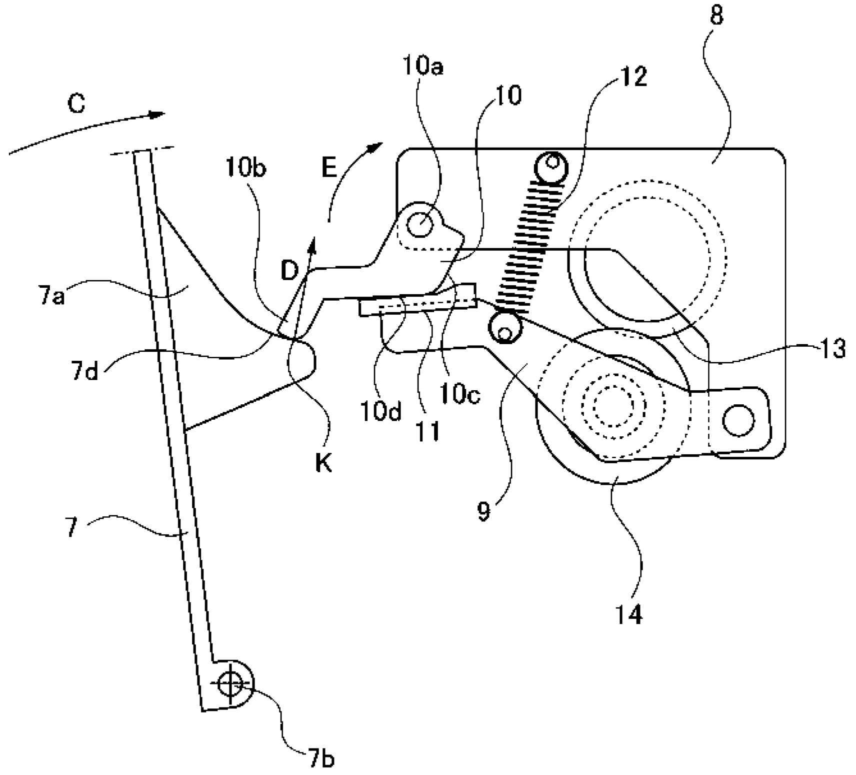
FIG. 4 is an explanatory view of operation of the switching lever.
Figure 5:
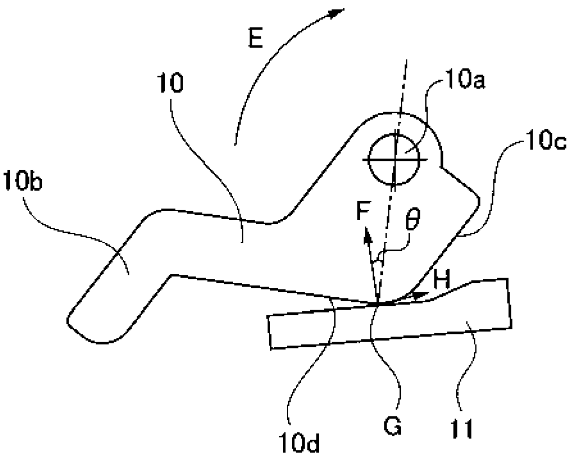
FIG. 5 is an explanatory view of operation of the switching lever.

Moreover, the fixing portion 4 includes an upper frame 8, a support arm 9, a switching lever (operation lever) 10, a pressing plate 11, and a spring 12. The fixing portion 4 in the image forming apparatus according to the present embodiment will be described with reference to FIGS. 1 and 3 to 5. FIG. 1 is a cross-sectional view of the fixing portion. FIGS. 3 to 5 are explanatory diagrams of the operation of the switching lever.

The upper frame 8 is a first support member that supports the heating roller 13 and the support arm 9. The upper frame 8 is supported by the image forming apparatus 1. Here, a configuration in which the heating roller 13 is supported by the upper frame 8 of the fixing portion 4 is exemplified, but the present invention is not limited thereto, and the heating roller 13 may be supported by the image forming apparatus 1.

The support arm 9 includes a bearing 15 provided at a central portion, a shaft support portion 9*a* provided at one end, the pressing plate 11 provided at the other end, and a locking portion 9*b* provided between the bearing 15 and the pressing plate 11. The bearing 15 supports a shaft at each end in a longitudinal direction of the pressure roller 14. Accordingly, the pressure roller 14 is rotatably supported with respect to the support arm 9. In addition, the support arm 9 is swingably supported by the upper frame 8 around the shaft support portion 9*a*.

The pressing plate 11 is attached to the other end of the support arm 9. The pressing plate 11 is a portion (receiving portion) that engages with the switching lever 10 as described later.

The spring 12 is a biasing member that presses the heating roller 13 and the pressure roller 14 and is provided between the upper frame 8 and the support arm 9. Here, a configuration in which the spring 12 applies a force to the pressure roller 14 toward the heating roller 13 is exemplified as a configuration in which the spring 12 applies a force to one of the pressure roller 14 and the heating roller 13 toward the other.

The spring 12 is, for example, a tension coil spring. One end of the spring 12 is locked to a locking portion 8*a* provided in the upper frame 8, and the other end is locked to a locking portion 9*b* provided in the support arm 9 to generate a tensile force between the heating roller 13 and the pressure roller 14. Accordingly, the spring 12 applies a force to (presses) the pressure roller 14 supported by the support arm 9 with respect to the heating roller 13 supported by the upper frame 8.

The switching lever 10 is a switching member for adjusting a pressing force (nip pressure and nip width) between the heating roller 13 and the pressure roller 14. The switching lever 10 includes a shaft support portion 10*a*, an operation portion 10*b*, a first cam portion 10*c*, and a second cam portion 10*d*. The switching lever 10 is rotatably supported by the upper frame 8 around the shaft support portion 10*a*. The operation portion 10*b* is a portion operated by a user. For example, the switching lever 10 is manually operated so as to be located at a first position when plain paper is discharged to the inner side the rear door 7 that is open. In addition, the switching lever 10 is manually operated so as to be located at a second position when an envelope is discharged to the inner side of the rear door 7 that is open.

The first cam portion 10*c* abuts on the pressing plate 11 which is a receiving portion attached to the other end of the support arm 9. In a state where the first cam portion 10*c* abuts on the pressing plate 11 as illustrated in FIG. 1, the shortest distance from the center of the shaft support portion 10*a*, which is the rotation center, to the first cam portion 10*c* is a distance D1. The switching lever 10 causes the first cam portion 10*c* to abut on the pressing plate 11 and holds the support arm 9 at a first pressing position (position illustrated in FIG. 1) where the support arm 9 is pressed with a first pressing force. At this time, the pressure roller 14 presses the heating roller 13 with the first pressing force. The position of the pressure roller 14 at this time is also referred to as the first pressing position.

The second cam portion 10*d* abuts on the pressing plate 11 which is a receiving surface attached to the other end of the support arm 9 in the switching lever 10. In a state where the second cam portion 10*d* abuts on the pressing plate 11 as illustrated in FIG. 3, the shortest distance from the center of the shaft support portion 10*a*, which is the rotation center, to the second cam portion 10*d* is a distance D2 longer than the distance D1 to the first cam portion 10*c*. That is, the second cam portion 10*d* is provided at a position where the distance D2 from the center of the shaft support portion 10*a*, which is the rotation center, is longer than the distance D1 to the first cam portion 10*c*. The switching lever 10 causes the second cam portion 10*d* to abut on the pressing plate 11 and holds the support arm 9 at a second pressing position where the support arm 9 is pressed with a second pressing force smaller than the first pressing force. At this time, the pressure roller 14 presses the heating roller 13 with the second pressing force smaller than the first pressing force. The position of the pressure roller 14 at this time is also referred to as the second pressing position.

Therefore, the switching lever 10 can switch the pressing force between the heating roller 13 and the pressure roller 14 by operating the operation portion 10*b* so that the switching lever 10 rotates around the shaft support portion 10*a* and causing the first cam portion 10*c* or the second cam portion 10*d* to abut on the pressing plate 11 of the support arm 9.

Moreover, as illustrated in FIG. 4, the rear door 7 as the opening/closing member is provided with a door cam portion 7*a* as an abutting portion (protrusion) capable of abutting on the switching lever 10. The door cam portion 7*a* comes into contact with the switching lever 10 holding the support arm 9 at the second pressing position by the movement of the rear door 7 from the open position to the close position and generates a force for moving the support arm 9 toward the first pressing position in the rear door 7.

Specifically, the door cam portion 7*a* has a contact portion 7*d* that comes into contact with the operation portion 10*b* of the switching lever 10 holding the support arm 9 at the second pressing position. The contact portion 7*d* has an inclination (inclined surface) that generates a force for moving the support arm 9 toward the first pressing position with respect to the switching lever 10 by the movement of the rear door 7 from the open position to the close position. Here, the inclination of the contact portion 7*d* is not limited to a linear inclination (inclined surface) and may be, for example, an arc-shaped curved surface (curved surface).

Moreover, the inclination of the contact portion 7*d* is an inclination in which the distance from the center of the shaft 7*b*, which is the rotation center of the rear door 7, to a contact point K with the operation portion 10*b* of the switching lever 10 gradually increases according to the movement of the switching lever 10 from the open position to the close position.

Here, an operation for adjusting a nip width (nip pressure and pressing force) of the fixing portion 4 will be described.

By operating the switching lever 10 to cause the first cam portion 10*c* to abut on the pressing plate 11, the position of the support arm 9 is determined, and the support arm 9 is held at the first pressing position illustrated in FIG. 1. As a result, the pressing force between the heating roller 13 and the pressure roller 14 becomes the first pressing force, and the nip width between the heating roller 13 and the pressure roller 14 is also determined. The position of the pressure roller 14 at this time is also referred to as the first pressing position. At this time, the switching lever 10 is located at the first position. That is, the switching lever 10 can move to the first position to position the pressure roller 14 at the first pressing position. When the pressure roller 14 is located at the first pressing position, the nip width is the largest and becomes a state suitable for fixing plain paper. Here, the nip width is a length (width) in a width direction orthogonal to a conveying direction of a sheet. The first pressing position illustrated in FIG. 1 is set as an initial position.

When a sheet to be printed is cardboard having a basis weight larger than that of plain paper or an envelope having a size in the width direction smaller than that of plain paper, the nip width between the heating roller 13 and the pressure roller 14 needs to be smaller than the nip width at the initial position. In other words, the pressing force of the pressure roller 14 to the heating roller 13 needs to be set to the second pressing force smaller than the first pressing force.

In order to reduce the above-described nip width, the rear door 7 is first opened in the direction of an arrow A as illustrated in FIG. 3. That is, the engagement of the rear door 7 with the image forming apparatus 1 is released, the rear door 7 is moved from the close position (the position illustrated in FIG. 1) to the open position in which the rear door 7 is retracted, and the space between the fixing portion 4 and the discharge portion 6 is opened. An envelope that has passed through the fixing portion 4 is discharged onto the inner side of the rear door 7 located in the open position. Thereafter, the switching lever 10 is rotated in the direction of an arrow B using the operation portion 10*b*. Then, the surface that abuts on the pressing plate 11 of the support arm 9 is changed from the first cam portion 10*c* to the second cam portion 10*d*. That is, the distance from the center of the shaft support portion 10*a*, which is the rotation center of the switching lever 10, to the pressing plate 11 is switched to the distance D2 longer than the distance D1 to the first cam portion 10*c*.

By changing the surface that abuts on the pressing plate 11 of the support arm 9 to the second cam portion 10*d* in this manner, the position of the support arm 9 is switched from the initial position (first pressing position) illustrated in FIG. 1 to the second pressing position illustrated in FIG. 3, and the support arm 9 is held at the second pressing position. As a result, since the distance from the center of the shaft support portion 10*a*, which is the rotation center of the switching lever 10, to the pressing plate 11 becomes larger than that at the initial position, the pressing force between the heating roller 13 and the pressure roller 14 becomes the second pressing force smaller than the first pressing force. The position of the pressure roller 14 at this time is also referred to as the second pressing position. At this time, the switching lever 10 is located at the second position. That is, the switching lever 10 can move to the second position to position the pressure roller 14 at the second pressing position. When the pressure roller 14 is located at the second pressing position, the nip width between the heating roller 13 and the pressure roller 14 becomes a nip width smaller than the nip width at the initial position and becomes a state suitable for fixing cardboard, an envelope, and the like.

In this manner, the nip width (nip pressure and pressing force) of the fixing portion 4 is adjusted according to the type of sheet to be printed.

In the image forming apparatus, as illustrated in FIG. 4, when a closing operation (movement in a C direction) of the rear door 7 is performed in a state where the switching lever 10 holds the support arm 9 at the second pressing position, the contact portion 7*d* of the door cam portion 7*a* provided on the rear door 7 comes into contact with the operation portion 10*b* of the switching lever 10. At this time, the operation portion 10*b*, which is a gripping portion of the switching lever 10, is positioned lower in the vertical direction when the switching lever 10 is positioned at the second position than when the switching lever 10 is positioned at the first position. When the switching lever 10 is located at the second position, the door cam portion 7*a* abuts on the switching lever 10 during the movement of the rear door 7 from the open position to the close position.

Here, the inclination of the contact portion 7*d* of the door cam portion 7*a* is an inclination in which the distance from the center of the shaft 7*b*, which is the rotation center of the rear door 7, to the contact point K with the operation portion 10*b* of the switching lever 10 gradually increases according to the movement of the switching lever 10 from the open position to the close position. Accordingly, by the operation of closing the rear door 7 in the direction of an arrow C illustrated in FIG. 4, a force D for moving the support arm 9 toward the first pressing position with respect to the switching lever 10 is generated at the contact point K between the contact portion 7*d* and the operation portion 10*b*. That is, due to the movement of the switching lever 10 from the open position to the close position, the force D is generated at the contact point K between the contact portion 7*d* and the operation portion 10*b*, and the switching lever 10 rotates in the direction of an arrow E. Thereafter, while the door cam portion 7*a* and the operation portion 10*b* are in contact with each other, the switching lever 10 rotates in the direction of the arrow E by the movement of the rear door 7. That is, when the switching lever 10 is located at the second position, the door cam portion 7*a* moves the switching lever 10 from the second position to the first position according to further movement of the rear door 7 from the open position to the close position.

As illustrated in FIG. 5, when the switching lever 10 is rotated in the direction of the arrow E by the movement of the rear door 7 in the closing direction, a rotational moment $F\sin\theta$ is applied to a contact point G between the switching lever 10 and the pressing plate 11. At this time, a frictional force H between the switching lever 10 and the pressing plate 11 also acts on the contact point G. Here, a force F is a force applied to the contact point G by a biasing force of the spring 12, and an angle $\theta$ is an angle formed by the force F and a straight line L connecting the contact point G and the axial center of the shaft support portion 10*a* of the switching lever 10. At the contact point G, while the rotational moment $F\sin\theta$ is smaller than the frictional force H, the switching lever 10 rotates in the direction of the arrow E to the same extent as the switching lever 10 is pushed by the rear door 7.

However, when the rotational moment $F\sin\theta$ applied to the contact point G becomes larger than the frictional force H between the switching lever 10 and the pressing plate 11, the switching lever 10 automatically rotates in the direction of the arrow E by the biasing force of the spring 12. Then, the switching lever 10 is separated from the door cam portion 7*a* and stops at the first pressing position (position illustrated in FIG. 1) where the first cam portion 10*c* abuts on the pressing plate 11.

Therefore, according to the above-described configuration, even if it is forgotten to return the nip pressure of the fixing portion 4 to the first pressing force after the printing of cardboard or an envelope is finished, the switching lever 10 can be switched from the position illustrated in FIG. 3 to the initial position illustrated in FIG. 1 by operation of closing the rear door 7. That is, according to the present embodiment, it is possible to improve the operability for adjusting the nip pressure of the fixing portion 4. As a result, even when the nip pressure of the fixing portion 4 is forgotten to be returned to the initial position (first pressing force) and plain paper is printed, an image defect due to insufficient nip pressure (fixing failure) of the fixing portion 4 can be prevented.

In general, a spring is disposed at an end of the pressure roller 14 to press the pressure roller 14 toward the heating roller 13. That is, the spring presses each end of the pressure roller 14 toward the heating roller 13. In such a configuration, a force of pressing the heating roller 13 by the pressure roller 14 is stronger at the ends than at the central portion. Therefore, the diameter of the pressure roller 14 is larger at the central portion than at the ends in a rotational axis direction of the pressure roller 14.

If the rear door 7 can be closed without returning the nip pressure of the fixing portion 4 to the first pressing force, a sheet other than an envelope may be printed with the nip pressure of the fixing portion 4 being the second pressing force. As a result, the sheet cannot be sufficiently pressed by the pressure roller 14 and the heating roller 13, and a fixing failure may occur. In particular, since the pressing force of the pressure roller 14 against the heating roller 13 is weak at the ends of the pressure roller 14, it is considered that a fixing failure at ends of the sheet becomes remarkable.

Figure 6:
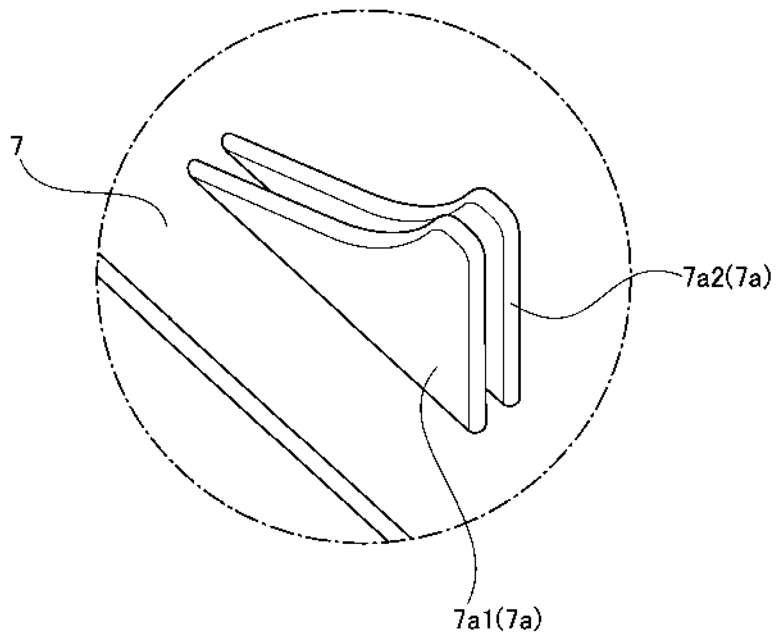
FIG. 6 is a perspective view of ribs forming a door cam portion of a rear door.

As illustrated in FIG. 6, the door cam portion 7*a* as an abutting portion (protrusion) provided on the rear door 7 is formed of two or more plate-like ribs 7*a*1 and 7*a*2 thinner than the thickness of the rear door 7. In other words, the door cam portion 7*a* is plate-like ribs 7*a*1 and 7*a*2 extending in a direction perpendicular to the thickness direction of the rear door 7. A plurality of the ribs 7*a*1 and 7*a*2 forming the door cam portion 7*a* is formed on the rear door 7 for one switching lever 10. FIG. 6 is a perspective view of ribs forming the door cam portion 7*a* of the rear door 7.

The rear door 7 is a resin molded cover and is an exterior cover that forms an exterior of the image forming apparatus 1. When the rib-shaped door cam portion 7*a* is formed on the rear door 7, the thickness of each of the ribs is determined. Normally, in order to prevent a molding defect such as a sink mark from occurring in the appearance of the rear door 7, the thickness of the rib forming the door cam portion 7*a* needs to be set to 50% to 70% of the thickness of the rear door 7. Here, assuming that the thickness of the rear door 7 is 2 mm, the thickness of the rib forming the door cam portion 7*a* is 1 mm to 1.4 mm. The rib forming the door cam portion 7*a* needs to have strength not overcome by the force D for moving the switching lever 10 acting on the contact point K between the door cam portion 7*a* and the switching lever 10. Therefore, the door cam portion 7*a* provided on the rear door 7 is formed of the two ribs 7*a*1 and 7*a*2 thinner than the thickness of the rear door 7.

Here, two ribs are used as the plurality of plate-shaped ribs forming the door cam portion 7*a*, but the present invention is not limited thereto. In a case where the strength is insufficient, three or more plate-shaped ribs may be used accordingly.

In the configuration described above, when the rear door 7 is closed in a state where the switching lever 10 pushes down the support arm 9, the door cam portion 7*a* as an abutting portion pushes up the switching lever 10. That is, when the rear door 7 is closed, the support arm 9 is automatically pushed up. In a second embodiment described below, when the rear door 7 is closed while the switching lever 10 pushes down the support arm 9, an abutting portion 7*e* as an abutting portion abuts on the switching lever 10, and the further rotation of the rear door 7 is stopped.

Figure 7:
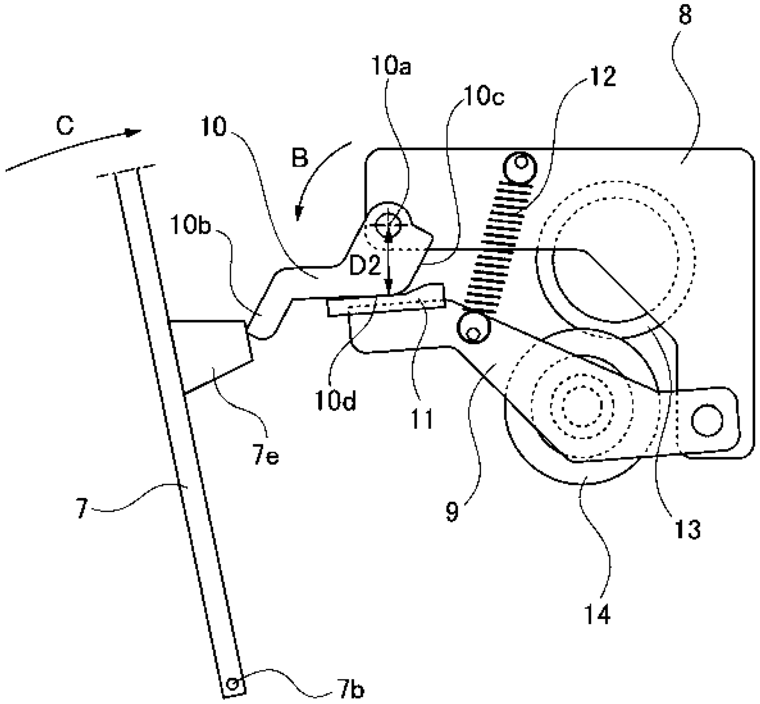
FIG. 7 is a diagram illustrating a configuration of a rear door according to a second embodiment.

FIG. 7 is a diagram for describing a configuration of a rear door 7 according to the second embodiment. In the embodiment described above, the door cam portion 7*a* is provided on the rear door 7, but in the present embodiment, the abutting portion 7*e* is provided instead of the door cam portion 7*a*. The abutting portion 7*e* is, for example, a protrusion formed on the inner side of the rear door 7. Similarly to the configuration of the door cam portion 7*a*, one plate may be used, or a plurality of plates may be used.

When the switching lever 10 is located at the second position, the abutting portion 7*e* abuts on the switching lever 10 during the movement of the rear door 7 from the open position to the close position so as not to allow the rear door 7 to be closed. In addition, when the switching lever 10 is located at the first position, the abutting portion 7*e* does not abut on the switching lever 10 during the movement of the rear door 7 from the open position to the close position so as to allow the rear door 7 to be closed.

As illustrated in FIG. 7, when the switching lever 10 pushes down the support arm 9, the switching lever 10 is located in the movement path of the abutting portion 7*e* that moves with the rotation of the rear door 7. That is, when the rear door 7 is closed in the direction of the arrow C in FIG. 7 in a state where the switching lever 10 pushes down the support arm 9, the abutting portion 7*e* abuts on the switching lever 10. In other words, when the switching lever 10 pushes down the support arm 9, the switching lever 10 is disposed so as to be positioned in the movement path of the abutting portion 7*e* that moves with the rotation of the rear door 7.

On the other hand, when the switching lever 10 is pushed up, the switching lever 10 is located outside the movement path of the abutting portion 7*e* that moves with the rotation of the rear door 7. That is, even when the rear door 7 is closed in the direction of the arrow C in FIG. 7, the abutting portion 7*e* does not abut on the switching lever 10. Alternatively, even in a contact state, the rear door 7 can be completely closed. In other words, when the switching lever 10 is pushed up, the switching lever 10 is disposed so as to be positioned outside the movement path of the abutting portion 7*e* that moves with the rotation of the rear door 7.

As a result, even if the user forgets to push up the switching lever 10 and closes the rear door 7, the abutting portion 7*e* abuts on the switching lever 10. Since the user cannot further close the rear door 7, the user can notice that the user has forgotten to push up the switching lever 10.

Note that, in the above-described embodiments, a printer has been exemplified as the image forming apparatus, but the present invention is not limited thereto. For example, another image forming apparatus such as a copying machine or a facsimile machine, or another image forming apparatus such as a complex machine combining these functions may be used. Alternatively, the image forming apparatus may be an image forming apparatus that uses a sheet carrier and sequentially superimposes and transfers toner images of respective colors on a sheet carried on the sheet carrier. Alternatively, the image forming apparatus may be an image forming apparatus that uses an intermediate transfer member, sequentially superimposes and transfers toner images of respective colors on the intermediate transfer member, and collectively transfers the toner images carried on the intermediate transfer member on a sheet. Similar effects can be obtained by applying the present invention to these image forming apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-206770, filed Dec. 14, 2020, which is hereby incorporated by reference herein in its entirety.

What is claimed is:

1. An image forming apparatus comprising:

a fixing unit including a heating roller configured to rotate about a rotational axis and heat an unfixed image formed on a sheet, and a pressure roller configured to nip the sheet with the heating roller, the fixing unit fixing the unfixed image to the sheet;

a housing configured to contain the fixing unit;

an exterior cover provided on the housing so as to be rotatable between an open position and a closed position with respect to the housing, the exterior cover being rotatable about an axis oriented in the same direction that the rotational axis of the heating roller is oriented, the exterior cover forming an exterior of the image forming apparatus in a state where the exterior cover is at the closed position with respect to the housing, and the sheet on which the unfixed image is fixed by the fixing unit being discharged onto an inner side of the exterior cover in a state where the exterior cover is at the open position with respect to the housing;

an operation lever configured to move the pressure roller, the operation lever being movable between (1) a first position for positioning the pressure roller at a first pressing position where the pressure roller presses the heating roller with a first pressing force and (2) a second position for positioning the pressure roller at a second pressing position where the pressure roller presses the heating roller with a second pressing force smaller than the first pressing force; and a contact portion provided on an inner side of the exterior cover, wherein, in a state where the operation lever is located at the second position, the contact portion contacts the operation lever during movement of the exterior cover from the open position toward the closed position and, after the contact, the operation lever separates from the contact portion, and wherein, in a state where the operation lever is located at the first position, the contact portion does not contact the operation lever during the movement of the exterior cover from the open position toward the closed position.

2. The image forming apparatus according to claim 1, wherein the contact portion is a plate-shaped rib extending in a direction perpendicular to a thickness direction of the exterior cover.

3. The image forming apparatus according to claim 1, wherein the contact portion comprises a plurality of plate-shaped ribs each extending in a direction perpendicular to a thickness direction of the exterior cover.

4. The image forming apparatus according to claim 1, wherein the pressure roller is disposed below the heating roller in a vertical direction, and a gripping portion of the operation lever is located lower in the vertical direction when the operation lever is located at the second position than when the operation lever is located at the first position.

5. The image forming apparatus according to claim 1, wherein, when the exterior cover is closed, a sheet that has passed through the fixing unit is discharged to a sheet discharge tray provided in an upper portion of the image forming apparatus.

6. The image forming apparatus according to claim 5, wherein the operation lever (1) is manually operated so as to be positioned at a first position when plain paper is discharged onto the inner side of the exterior cover that is open, and (2) is manually operated so as to be positioned at a second position when an envelope is discharged onto the inner side of the exterior cover that is open.

7. The image forming apparatus according to claim 1, further comprising:

a biasing member, wherein the biasing member applies force to the operation lever thereby the operation lever separates from the contact portion after the contact of the operation lever and the contact portion.

* * * * *